INVENTOR.
Gerald R. Stump
BY
Carl A. Stickel
ATTORNEY

United States Patent Office 3,450,388
Patented June 17, 1969

1

3,450,388
MIXER WITH FLUSHING VALVE IN THE OUTLET
Gerald R. Stump, Centerville, Ohio, assignor to General Motors Corporation, Detroit, Mich., a corporation of Delaware
Filed Mar. 12, 1968, Ser. No. 712,440
Int. Cl. B01f 15/02
U.S. Cl. 259—8                                    3 Claims

ABSTRACT OF THE DISCLOSURE

In the preferred form, the mixing chamber is provided with a mixer and a separate ball-shaped rotary valve in its outlet provided with one normal delivery passage aligned with the mixing chamber and its outlet. The ball-shaped valve also has a lateral passage which in the flushing position is oriented with a flushing discharge passageway while the aforementioned main passageway is shut off from the outlet. The mixer is provided with two normal delivery valves to the mixing chamber, one of which is also provided with a flushing passage connecting with supplies of flushing fluid when the delivery valves are in the closed position.

---

This invention relates to mixing and discharging apparatus provided with quick flushing.

An obnoxious problem exists with intermittently operative apparatus for mixing and discharging ingredients which tend to adhere and congeal within the mixing chamber and discharge outlet of the apparatus. To prevent this, it is imperative that the portions of the apparatus within which the ingredients tend to adhere be thoroughly and quickly flushed to prepare the apparatus for further use.

It is an object of this invention to provide an improved quick flushing arrangement wherein all the necessary surfaces are quickly and thoroughly flushed under sufficient pressure to assure complete and thorough flushing.

It is another object of this invention to provide the discharge outlet with a valve providing adequate direct flow of ingredients out of the mixing chamber during normal delivery which can also be operated to restrict the discharge of flushing fluid for quick flushing following each use.

The invention provides a valve at the outlet of the mixer providing a free discharge position for normal delivery and a restricted discharge position for delivery to a reclaiming tank.

Further objects and advantages of the present invention will be apparent from the following description, reference being had to the accompanying drawings, wherein preferred embodiments of the present invention are clearly shown.

Figure 3:
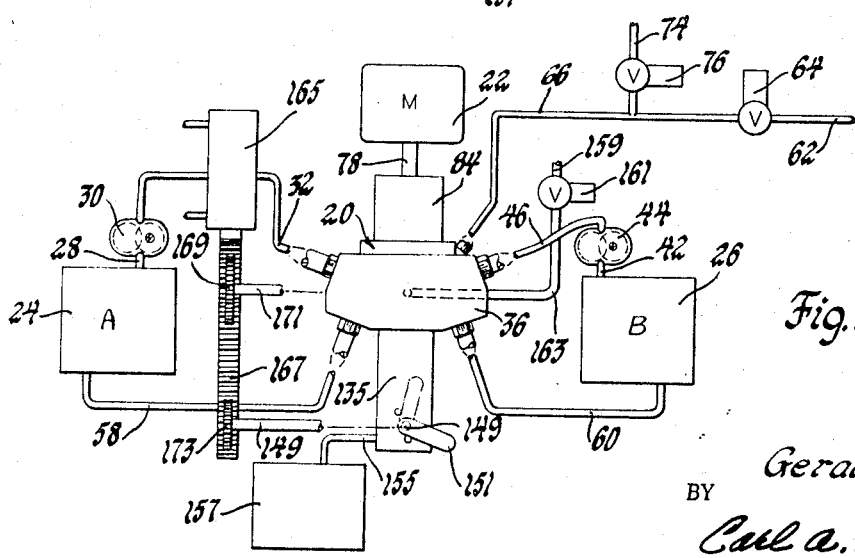
FIGURE 3 is a view in elevation partly diagrammatic showing the mixer with the supply and flushing systems.

Referring now more particularly to FIGURE 3, there is shown a mixer 20 driven by an electric motor 22. Sup-

Figure 1:
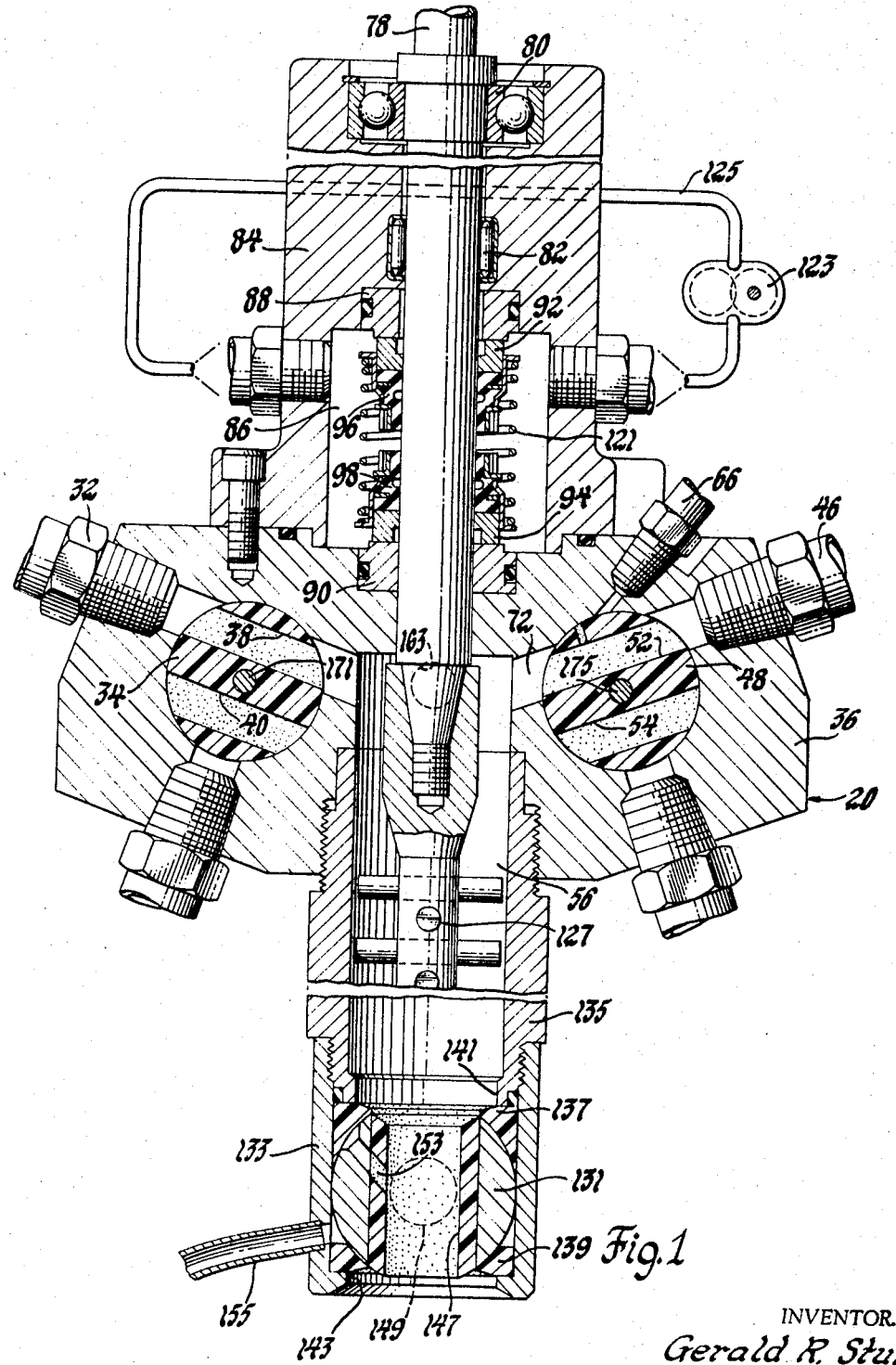
FIGURE 1 is a vertical sectional view through a mixer embodying one form of my invention with the valves shown in the normal delivery and discharge positions.

2 ply tanks 24 and 26 are provided for supplying components A and B. These supply tanks are connected to the mixer by separate recirculating systems. The supply tank 24 is connected by piping 28 to a pump 30 which delivers the component A through the piping 32 at the proper rate to the rotary valve 34 in the valve block 36. The rotary valve 34 is provided with parallel passages 38 and 40. The supply tank 26 is connected by the piping 42 to supply pump 44 which draws the component B from the supply tank 26 and delivers this component through the piping 46 to the rotary valve 48 in the valve block 36. The rotary valve 48 has parallel passages 52 and 54 therein. In FIGURE 1, the rotary valves 34 and 48 are shown positioned for delivery into the mixing chamber 56 through the alignment of the passages 38 and 52 with the piping 32 and 46. If desired, a third component such as a volatile liquid may be supplied through the supply pipe 159, the solenoid valve 161 and the piping 163 to the mixing chamber 56.

Figure 2:
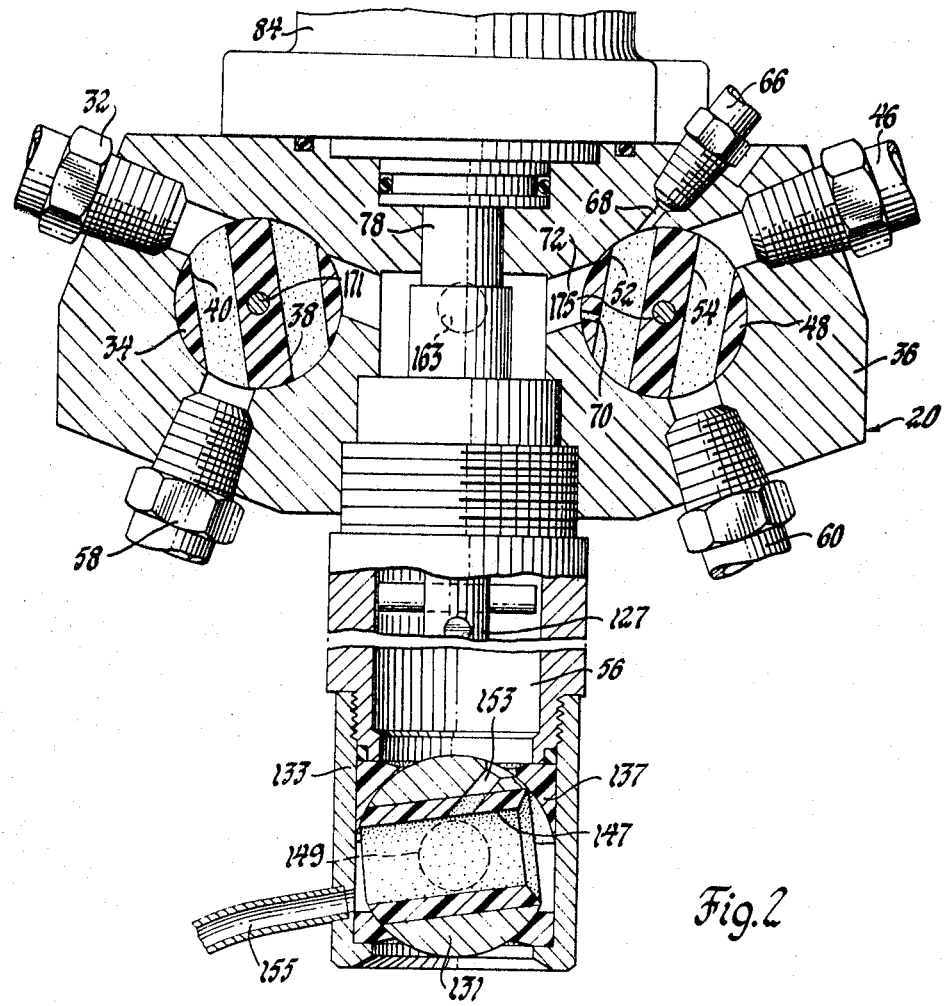
FIGURE 2 is a fragmentary vertical sectional view somewhat similar to FIGURE 1 with the valve shown in the recirculating and flushing positions.

When the delivery of the components A and B to the mixing chamber 56 is to be stopped, the valve 34 is turned clockwise and the valve 48 is turned counterclockwise to the positions shown in FIGURE 2 until the passage 40 connects the inlet piping 32 with the return pipe 58 and the passage 54 connects the inlet piping 46 with the return piping 60. With this arrangement, flow of the components A and B to the mixing chamber 56 is effectively blocked and the components are returned through the recirculating system to their respective supply tanks 24 and 26. That is, whenever the valves 34 and 48 are turned to the position shown in FIGURE 2, the pumps 30 and 44 recirculate the respective components A and B through the two piping systems with which they are connected.

When the components A and B tend to adhere and congeal within the mixing chamber 56 during any shut off period, it is necessary to flush the mixing chamber. For this purpose, solvent or flushing liquid is supplied through the piping 62 under the control of a solenoid valve 64 and the piping 66 to a passage 68 in the valve block which connects with the passage 52 in the valve 48. The passage 52 is provided with a branch passage 70 which provides for the restricted discharge of the solvent or flushing liquid through the passage 72 into the mixing chamber 56. Also connected to the flushing system is an air supply pipe 74 connecting to a solenoid valve 76 which following the flow of solvent provides the flow of air into the piping 66 through the passages 52, 70 and 72 into the mixing chamber 56 for cleaning out the components A and B; and if desired, the valve 34 may be provided with a branch passage corresponding to the branch passage 70 and the piping 66 also connected to a passage associated with the valve 34 corresponding to the passage 68.

The motor 22 is connected to and rotates a shaft 78 which is rotated and mounted in an upper ball bearing 80 and a lower roller bearing 82 located in the bearing housing 84. Below the bearing 82 is a shaft seal chamber 86 containing a double ended shaft seal provided with upper and lower stationary seal rings 88 and 90 which are sealed to the bearing housing 84 and the valve block 36 by O-rings. The seal also includes the upper and lower rotating seal rings 92 and 94 which are sealed to the shaft 78 by the elastomeric rings 96 and 98. A coil spring 121 is provided between the rotating seal rings 92 and 94 for holding them in engagement with the stationary seal rings 88 and 90. To prevent the heating of the seal rings a circulating lubricating system is provided including a pump 123 which withdraws the seal lubricant from the seal chamber 86 and forces the seal lubricant through the piping 125 back to the opposite side of the seal chamber 86. This prevents any of the components or flushing fluid from entering the seal chamber.

The bottom of the shaft 78 connects to a projecting pin type agitator 127 located in the mixing chamber 56. This pin type agitator is rotated during the delivery of the components A and B to the mixing chamber and also during the delivery of the flushing fluids thereto.

In the past it has been customary to provide a simple wide nozzle at the outlet of the mixing chamber 56. The flushing fluids would discharge freely through this outlet. This did not provide adequate and thorough flushing of the mixing chamber and the agitator and the connecting passages. According to my invention, I provide a ball-shaped valve 131 in the outlet fitting 133 at the bottom of the mixing chamber 56. This outlet fitting 133 threads onto the bottom of the mixer housing 135. The ball-shaped valve 131 is preferably made of polished stainless steel. However, if desired, glass fiber reinforced polytetrafluoroethylene or polyethylene or polypropylene may be used. This valve 131 preferably has spherical outer surfaces. It is held between the upper and lower rings 137 and 139 of polytetrafluoroethylene which have complementary spherical inner surfaces. The upper ring is held against the inner shoulder 141 at the bottom of the mixer housing 135 and the lower ring 139 is supported by the inturned flange 143 at the bottom of the fitting 133.

The ball-shaped valve 131 has a large straight passage extending directly through its center which is lined with a plastic tube 147. This tube 147 is normally aligned with the axis of the mixing chamber 56 and its housing 135 for normal delivery of the mixed components out of the bottom of the mixing chamber 56. The ball-shaped valve 131 is provided with diametrically opposite bearings 149, one of which connects to the exterior handle 151 by which the ball-shaped valve 131 may be manually rotated. The tube 147 and the valve 131 are provided with a branch passage 153. When the handle 151 is turned slightly more than one-fourth of a turn counterclockwise, the ball-shaped valve 131 seals the lower ring 139 and prevents the normal discharge from the fitting 133. This is done at the time the delivery valves 34 and 48 are turned from the delivery position shown in FIGURE 1 to the recirculating position shown in FIGURE 2.

When this valve 131 is so rotated, the flushing fluid is supplied through the piping 66 and the passages 68, 52, 70 and 72 to the mixing chamber 56 and flows from the mixing chamber 56 along with any residue of the components A and B remaining in the mixing chamber 56 through the passage 153 and the tube 147 to a flushing tube 155 provided at the side of the fitting 133. This flushing tube 155 extends to and discharges into the tank 157 from which the flushed materials may be either discarded or refined and recovered.

The passage 153 restricts the flow out of the mixing chamber 56 during the flushing period so that the flushing fluid is under pressure in the mixing chamber and there is a sufficient opportunity for the flushing liquid and the flushing air to mix with the components A and B as well as the third component to assure quick and thorough cleaning of the mixing chamber 56, its connecting passages as well as the agitator 127. This is provided by the restriction through the passage 153 which, however, is large enough to carry away all the residue from the mixing chamber 56. This valving arrangement 131 is especially important where the components of polyurethanes are mixed in the mixing chamber 56 to form either solid polyurethanes or polyurethane foam. Polyurethanes are known to adhere quickly and tenaciously to a great many materials so that it is necessary that they be flushed very quickly and thoroughly from the agitator 127 and the mixing chamber 56.

Preferably, the operation of the valves 34 and 48 as well as the valve 31, are coordinated and operated simultaneously. This is illustrated diagrammatically in FIGURE 3 wherein an actuating cylinder 165 is provided containing a piston connecting with a rack 167. This rack 167 meshes with an upper gear 169 which is connected by the shaft 171 to the valves 34 and 48. The rack 167 also connects to a lower gear 173 which is connected to the shaft 149 for operating the ball valve 131. The shaft 171 is connected either by linkage or by gearing to operate the shaft 175 and the valve 48, as shown in the Rill et al. Patent 3,220,801, issued Nov. 30, 1965. Other features of this valve arrangement are also further described in this patent.

While the embodiments of the invention as herein described, constitute preferred forms, it is to be understood that other forms might be adopted.

I claim:
1. A mixing and discharging apparatus adapted for quick flushing including a housing containing a mixing chamber provided with a first discharge outlet, first and second conduit means connected to said housing for supplying first and second components to said mixing chamber, third conduit means connected to said housing for supplying flushing fluid to said mixing chamber, means for mixing said components in said mixing chamber, valve means having one position for delivering said first and second components from said first and second conduit means to said mixing chamber and preventing delivery of said flushing fluid, said valve means having a second position for stopping the delivery of said components to said mixing chamber and delivering flushing fluids from said third conduit means to said mixing chamber, wherein the improvement comprises a discharge valve located at said first discharge outlet having an open position for discharging the mixed components, said housing also having a second discharge outlet of much smaller size as compared to said first discharge outlet adjacent said first discharge outlet, said discharge valve having means effective in its open position for shutting off the flow to said second discharge outlet, said discharge valve also having a closed position for closing said first discharge outlet and having means effective in said closed position for delivering said fluid to said second discharge outlet.

2. A mixing and discharging apparatus adapted for quick flushing including a housing containing a mixing chamber provided with a first discharge outlet, first and second conduit means connected to said housing for supplying first and second components to said mixing chamber, third conduit means connected to said housing for supplying flushing fluid to said mixing chamber, means for mixing said components in said mixing chamber, valve means having one position for delivering said first and second components from said first and second conduit means to said mixing chamber and preventing delivery of said flushing fluid, said valve means having a second position for stopping the delivery of said components to said mixing chamber and delivering flushing fluid from said third conduit means to said mixing chamber, wherein the improvement comprises a rotary valve located in said first discharge outlet and having a passage therethrough, said housing having a second discharge outlet of much smaller size as compared to the first discharge outlet located adjacent said first discharge outlet, said rotary valve having a first position orienting said passage with said first discharge outlet for conducting fluid from said mixing chamber through said first discharge outlet and having walls oriented in said first position for preventing the flow of fluid to said second discharge outlet, said rotary valve also having a second position orienting said passage with said second discharge outlet and orienting said walls to close said first discharge outlet.

3. An apparatus as defined in claim 2 wherein said rotary valve is ball-shaped.

References Cited

UNITED STATES PATENTS

| 2,990,252 | 6/1961 | Geldern | 23—252 |
| 3,026,183 | 3/1962 | Cole | 23—252 |
| 3,220,801 | 11/1965 | Rill | 259—8 X |
| 3,297,306 | 1/1967 | Napier | 259—8 |
| 3,318,580 | 5/1967 | Simonetti | 259—8 |

ROBERT W. JENKINS, *Primary Examiner.*

U.S. Cl. X.R.

23—252